United States Patent [19]
Parker

[11] 3,989,194

[45] Nov. 2, 1976

[54] GRAIN SCATTERER

[76] Inventor: Wallace R. Parker, R.R. No. 2, Box 252, Coatesville, Ind. 46121

[22] Filed: Mar. 3, 1976

[21] Appl. No.: 663,363

[52] U.S. Cl. ............................ 239/666; 239/687
[51] Int. Cl.² .................. B65G 65/32; A01C 17/00
[58] Field of Search .......... 239/665, 666, 668, 679, 239/681, 687; 214/17 CB

[56] References Cited
UNITED STATES PATENTS

| | | | |
|---|---|---|---|
| 3,488,007 | 1/1970 | Neuenschwander | 239/687 |
| 3,682,394 | 8/1972 | Shivvers | 239/687 X |
| 3,791,592 | 2/1974 | Cobb | 239/666 |
| 3,817,408 | 6/1974 | Hanson | 217/17 CB |

*Primary Examiner*—Robert S. Ward, Jr.
*Attorney, Agent, or Firm*—Jenkins, Hanley & Coffey

[57] ABSTRACT

A scatterer comprising a hopper for receiving particulate materials, a driven shaft extending downwardly and generally axially aligned with the outlet opening of the hopper, and a scattering plate disposed below the hopper to receive such material therefrom, the plate being connected to the shaft for rotation therewith. The plate is tilted on the shaft to have an upper end, a generally diametrically opposed lower discharge end, and opposite side flanges extending between the ends and generally equally spaced from the shaft. The improvement comprises an intermediate chute mounted on the shaft for rotation therewith between the hopper outlet opening and the scattering plate. This chute is tilted on the shaft opposite to the direction of tilting of the scattering plate to have a chute upper end generally above the discharge end of the plate and a diametrically opposed lower discharge end generally above the upper end of the plate. The intermediate chute is positioned to receive the material from the hopper outlet opening and to direct it downwardly on the upper end of the scattering plate. Thus, all the material being spread by the scattering plate is deposited on the upper end or upper end portion of the scattering plate.

9 Claims, 3 Drawing Figures

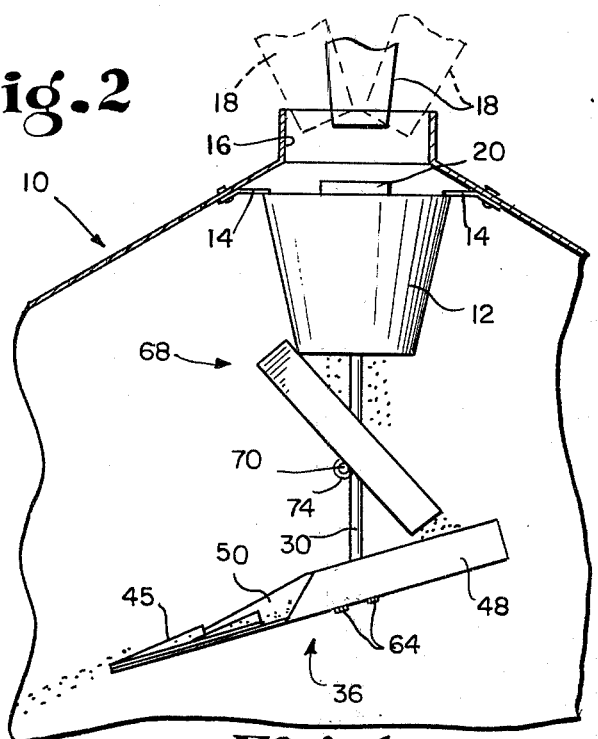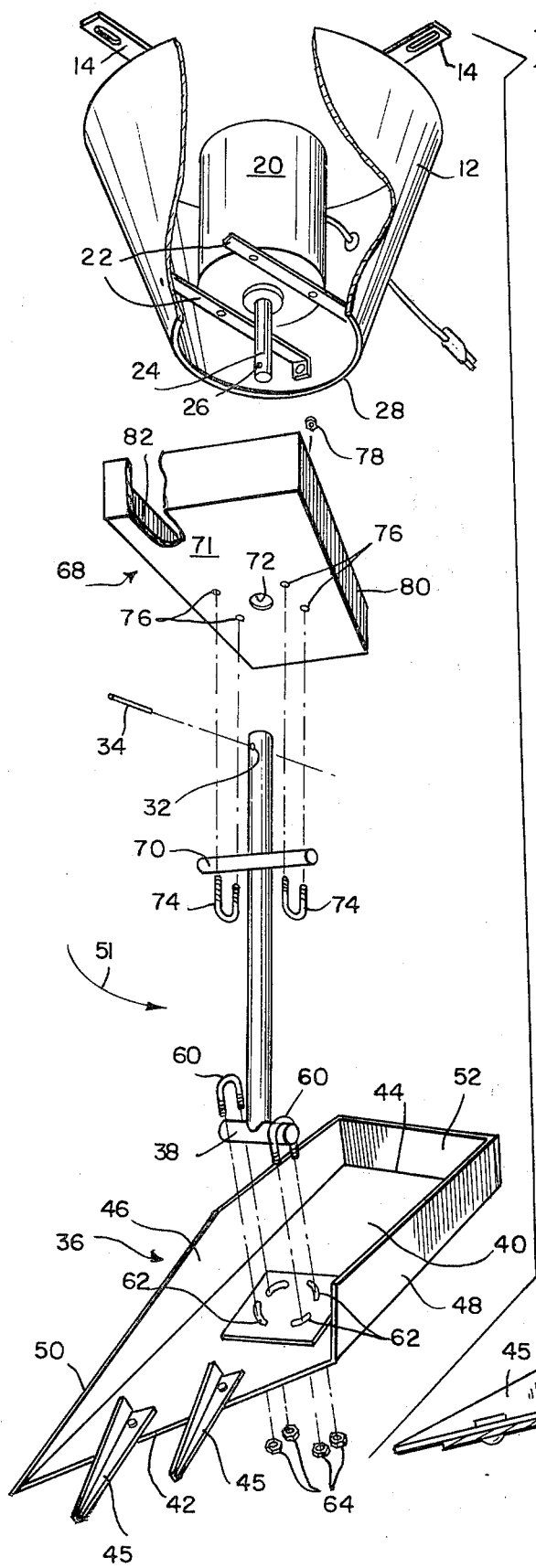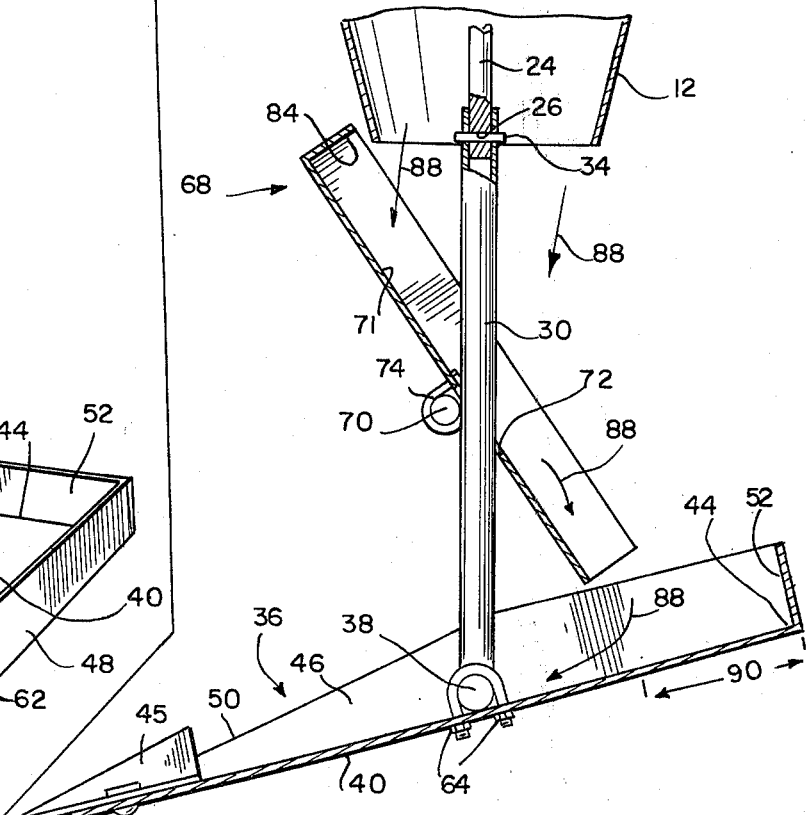
Fig. 2
Fig. 1
Fig. 3

GRAIN SCATTERER

The present invention relates to scatterers, and more particularly to the provision of a new and improved grain scatterer of the type which is mounted in the top of a grain bin and rotated evenly to spread the grain deposited into the grain bin. There are many such scatterers on the market. One such scatterer is disclosed and shown in U.S. Pat. No. 3,488,007 issued Jan. 6, 1970.

The scatterer of the present invention constitutes an improvement of the conventional and well known scatterer of the type shown in U.S. Pat. No. 3,488,007.

Conventional scatterers include a generally conical hopper with a downwardly directed outlet opening, a concentric, downwardly extending driven shaft, and a scattering plate mounted on that shaft beneath the outlet opening. The scattering plate is driven to spread the material evenly. In spite of the fact that it sounds easy evenly to spread granular material deposited from the hopper, in practice it is quite difficult evenly to spread such material. Conventional grain scatterers have their scattering plates tilted on the driven shaft such that there is an upper end on one side of the shaft and a lower discharge end on the opposite side of the shaft with side flanges extending between the ends, the side flanges being generally equally spaced from the shaft.

It is an object of the present invention to provide, between the scattering plate and the hopper outlet, an intermediate chute which receives all or most of the material from the hopper outlet and directs that material to the upper end of the scattering plate. I have discovered that it is very important to even scattering to have all of the material deposited at one end, i.e., the upper end of the scattering plate, so that all of the material starts generally from the same place on the scattering plate. This is in contrast to the conventional scatterers in which the material is merely deposited downwardly on the center of the scattering plate. My intermediate chute is tilted on the shaft generally opposite to the direction in which the scattering plate is tilted. Further, my intermediate chute is tilted to a much steeper angle than the scattering plate is tilted. Consequently, my intermediate chute moves the dropped material rapidly to the upper end of the scattering plate.

Preferably, both the scattering plate and the intermediate chute are mounted upon the driven shaft for adjustable tilting movement about generally parallel, horizontally extending axes. Since they are oppositely tilted, the intermediate chute has its upper end generally above the discharge end of the scattering plate and its diametrically opposite lower discharge end generally above the upper end of the scattering plate.

My presently preferred intermediate chute is generally trapezoidal in shape, having upstanding side walls extending from its wider upper end to its narrower lower end, the side walls being generally equally spaced from the shaft. The chute also preferably has an upstanding wall at its upper end extending between its side walls. The chute is designed such that the grain leaving the hopper is conveyed rapidly downwardly to the upper end of the scattering plate. I have constructed a scattering plate having side walls bounding its upper end to receive and hold the grain deposited thereon by the intermediate chute. In other words, it is my concept to have the grain collected at the upper end of the scattering plate and then directed downwardly from that upper end.

My intermediate chute, therefore, comprises means for directing falling particulate material to the upper end of the scattering plate.

In the drawings:

FIG. 1 is a fragmentary elevational view of the top of a grain bin with a scatterer in accordance with the present invention mounted therein;

FIG. 2 is an exploded perspective view of the grain scatterer of the present invention; and FIG. 3 is an enlarged fragmentary sectional view of the scatterer of the present invention.

The illustrative grain bin 10 is shown with a conventional, slightly conically shaped hopper 12 mounted in the center top thereof by means such as the illustrated brackets 14 to be below an entry port 16 conventionally provided at the top of bins. Auger chutes, such as indicated at 18, are used to drop grain through the port 16 into the hopper 12. The auger chute 18 is shown in solid lines coaxial with the port 16 and hopper 12. The auger chute 18 is also shown in broken lines very much out of alignment with the inlet port 16. The improved grain scatterer of the present invention will evenly spread grain when the auger chute 18 is displaced to the side and angled as shown in broken lines. In other words, with the scatterer of the present invention, it is not necessary to introduce the grain vertically downwardly through the very center of the entry port 16 of the bin 10.

Conventionally, hopper 12 has a motor 20 concentrically mounted therein upon support brackets 22 to have its output shaft 24 extending downwardly. The motor 20 may conventionally include a concentric gear reduction in the lower portion of its housing such that it is the gear reduction providing the relatively low speed output shaft 24. The output shaft 24, which illustratively has an opening 26 extending through its lower end, is concentric with the outlet opening 28 of the hopper 12.

An extension shaft 30 which is hollow, at least at its upper end, and which has an opening 32 extending diametrically therethrough is provided. The upper end of the shaft 30 is sleeved over the downwardly extending shaft 24 and the pin 34 is inserted through the openings 26, 32 to lock the shafts coaxially together.

A scatter plate assembly 36 is mounted at the lower end of the shaft 30 for rotation therewith. In the illustrative embodiment, a cross bar 38 is welded or otherwise securely fastened to the lower end of the shaft 30 to provide a horizontally extending pivot axis for the scatter plate assembly 36. The bottom 40 of the assembly 36 is placed against the bar 38 and there fastened, this bottom 40 having a lower discharge end 42 and a diametrically opposed upper end 44. Particularly, the scattering plate 36 is tilted relative to the shaft 30 such that it has lower end 42 and upper end 44 on diametrically opposite sides of the shaft. Deflectors 45 may be conventionally mounted at the lower end 42 as illustrated. Further, the lower end 42 may be cut at an angle relative to the direction of extension of the bar 38 as disclosed in U.S. Pat. No. 3,488,007. The scatter plate assembly 36 may have side flanges or side walls 46, 48 and the side flange or wall 46 may have a tapered portion 50 on the trailing side as the assembly is rotated in the counterclockwise direction indicated by the arrow 51. Such a tapered side 50 is shown in the U.S. Pat. No.

3,488,007. An end flange or end wall 52 may be provided at the upper end 44 to extend between the side flanges or side walls 46, 48 to provide a reservoir area for receiving grain on the scatter plate assembly. Particularly, the grain is scattered from this reservoir area. The end flange 52 illustratively is generally parallel to the bar 38 or generally perpendicular to the flanges 46 and 48.

Illustratively, U-bolts 60 which penetrate through arcuately slotted openings 62 are used to fasten the scatter plate assembly 36 to the cross bar 38. Nuts 64 are threaded onto the bolts 60, and the slots 62 are elongated arcuately about the axis of the shaft 30 to provide for some adjustment of the scatter plate assembly about that shaft axis.

The improvement of the present invention comprises a chute assembly 68 mounted on the shaft 30 for rotation therewith, the chute assembly being above the scatter plate assembly 36. A cross bar 70, parallel to the cross bar 38, is welded or otherwise securely fastened to the shaft 30 to provide a pivot support for the chute assembly 68. The bottom 71 of the chute assembly 68 is provided with an opening 72 through which the shaft 30 extends, and U-bolts 74 are provided for clamping the chute assembly in a selected position about the axis of the cross bar 70. The U-bolts 74 extend through openings 76 in the bottom 71, and nuts 78 are threaded onto these U-bolts.

The illustrative bottom 71 is flat and generally trapezoidal in shape having parallel opposite ends (upper and lower ends) and sides that incline inwardly from the wider upper end to the narrower lower end. Side walls or side flanges 80, 82 extend upwardly from the sides of the bottom 71 and are equally spaced apart on opposite sides of the shaft 30. An end wall or end flange 84 is provided at the upper end of the chute assembly 68 extending between the side walls or side flanges 80, 82.

As illustrated, and preferably, the chute assembly 68 is tilted oppositely to the direction in which the scatter plate assembly 36 is tilted. The upper end of the chute assembly 68, therefore, is above the lower end of the scatter plate assembly 36 and the lower end of the chute assembly is above the upper end of the scatter plate assembly. In FIG. 3, the arrows 88 represent the falling of grain from the hopper 12 downwardly. The grain first falls onto the chute assembly 68 and is there conveyed downwardly toward the upper end portion of the scatter plate assembly 36. Generally, all of the grain dropping from the hopper 12 is conveyed by the chute assembly 68 onto a region indicated by the reference numeral 90 of the bottom 40 of the scatter plate assembly. In other words, all of the grain being scattered generally leaves the scatter plate from the region indicated by the reference numeral 90.

What is claimed is:

1. A scatterer comprising a hopper for receiving particulate materials, said hopper having a downwardly directed outlet opening, a shaft generally axially aligned with the lower end of said hopper and said outlet opening, means for driving said shaft, a plate disposed below said hopper to receive such material therefrom, means for connecting said plate to said shaft for rotation therewith, said plate being tilted on said shaft to have an upper end, a generally diametrically opposed lower discharge end, and opposite side flange means extending between said ends, in which the improvement comprises an intermediate chute, means for mounting said intermediate chute on said shaft for rotation therewith, said chute being between said outlet opening and said plate, said chute being tilted on said shaft opposite to the direction of tilting of said plate to have an upper end generally above the lower discharge end of said plate and a diametrically opposite lower discharge end generally above the upper end of said plate, said chute being positioned to receive such material from said hopper outlet opening to direct it downwardly on the upper end of said plate.

2. The improvement of claim 1 in which said means for mounting said intermediate chute includes means defining a generally horizontal tilt axis for said chute, and said means for connecting said plate to said shaft also including means defining a generally horizontal tilt axis for said plate generally parallel to the tilt axis for said chute.

3. The improvement of claim 1 in which said side flange means of said plate are generally parallel and generally equally spaced from said shaft, said chute being generally trapezoidal in shape having a wider upper end and a narrower lower end, said ends being generally parallel, said chute having upstanding sidewalls extending from its wider upper end to its narrower lower end, said sidewalls being generally equally spaced from said shaft, said chute having an upstanding wall at its upper end extending between said sidewalls.

4. The improvement of claim 1 in which said chute is tilted downwardly at angle substantially greater than the angle at which said plate is tilted.

5. In a scatterer having a downwardly extending shaft, means for driving said shaft, a scattering plate, means for connecting said plate to said shaft for rotation therewith, said plate being tilted relative to said shaft to have an upper end, a diametrically opposed lower discharge end, and upstanding side flanges extending between said plate ends on opposite sides of said shaft, in which the improvement comprises means for directing falling particulate material to the upper end of said plate, said directing means including a chute mounted on said shaft for rotation therewith, said chute being disposed above said plate and having a discharge opening directed downwardly toward the upper end of said plate.

6. The improvement of claim 5 in which said connecting means for said plate defines a generally horizontally extending tilt axis about which said plate is adjustably tilted, and means for mounting said chute on said shaft for adjustable tilting movement about a generally horizontal axis generally parallel to the tilt axis for said plate.

7. The improvement of claim 5 in which said plate is formed to have an upstanding end flange at its said upper end extending between said upstanding side flanges to provide, with said side flanges, a reservoir for receiving the material from said chute.

8. The improvement of claim 5 in which said plate is tilted relative to horizontal by a first angle and said chute is tilted at a second and significantly steeper angle.

9. The improvement of claim 6 in which said connecting means for said plate defines a generally horizontally extending tilt axis about which said plate is adjustably tilted, and means for mounting said chute on said shaft for adjustable tilting movement about a generally horizontal axis generally parallel to the tilt axis for said plate.

* * * * *